No. 677,794. Patented July 2, 1901.
J. W. POINTS.
PRICE SCALE.
(Application filed Dec. 24, 1900.)
(No Model.) 3 Sheets—Sheet 1.
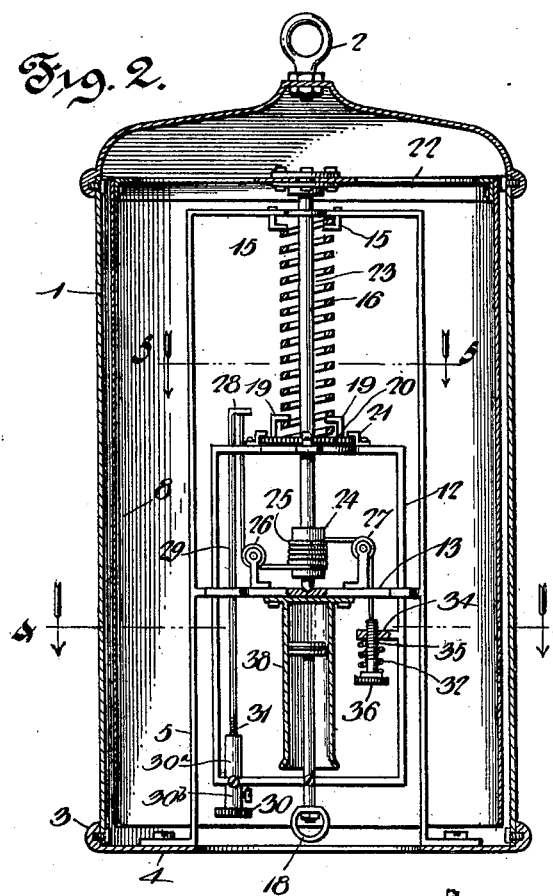
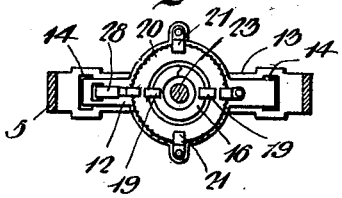
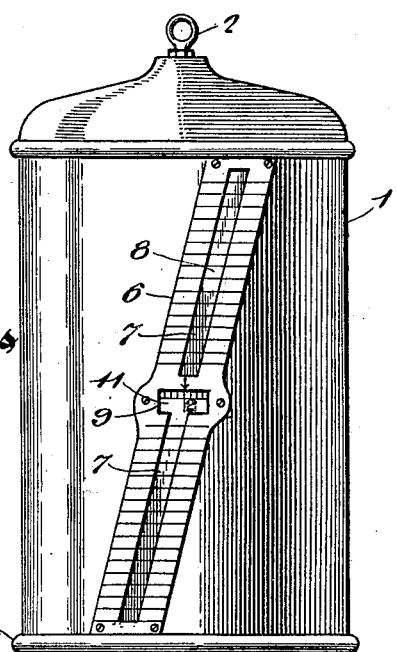
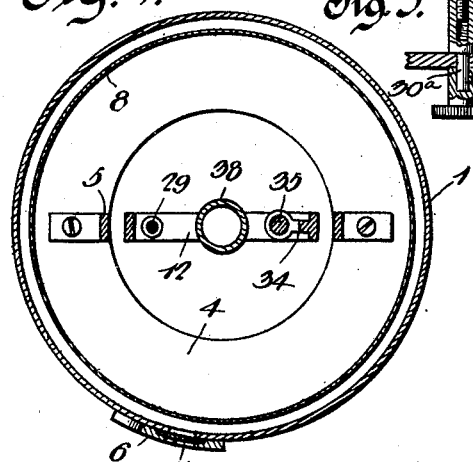
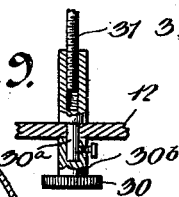
Witnesses J. W. Points, Inventor.
BY C. A. Snow & Co.
Attorneys No. 677,794. Patented July 2, 1901.
J. W. POINTS.
PRICE SCALE.
(Application filed Dec. 24, 1900.)
(No Model.) 3 Sheets—Sheet 2.
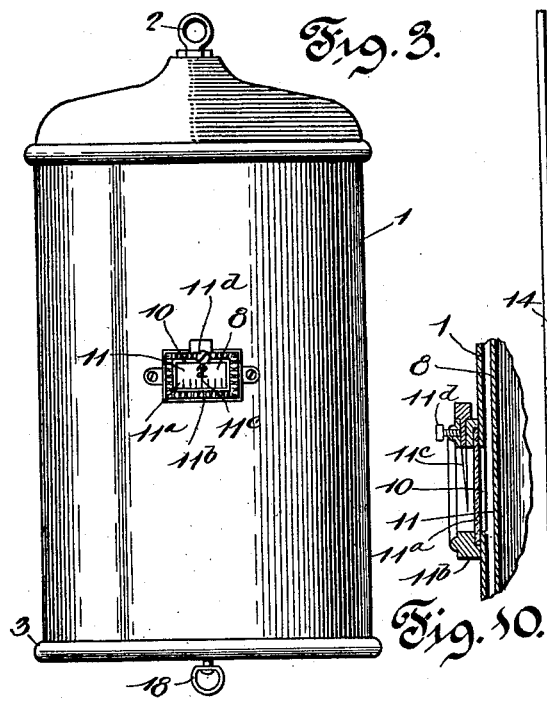
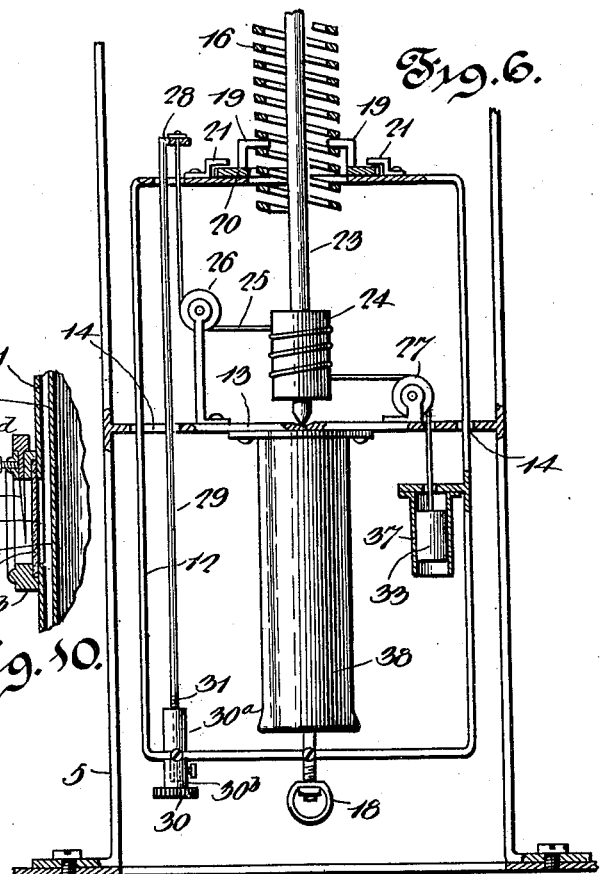
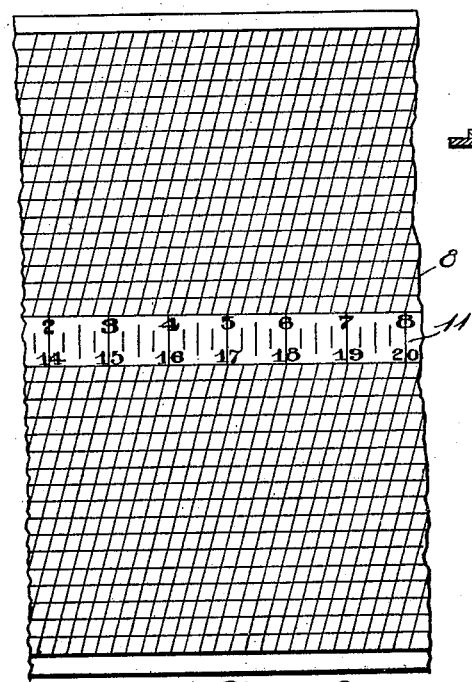
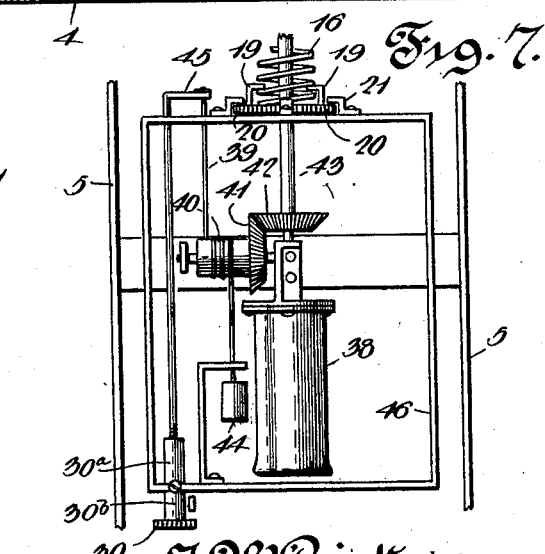
Witnesses
J. W. Points, Inventor
By C. A. Snow & Co.
Attorneys
THE NORRIS PETERS CO., PHOTO-LITHO., WASHINGTON, D. C.

No. 677,794. Patented July 2, 1901.
J. W. POINTS.
PRICE SCALE.
(Application filed Dec. 24, 1900.)
(No Model.) 3 Sheets—Sheet 3.

Witnesses
J. W. Points, Inventor.
BY C. A. Snow & Co.
Attorneys

UNITED STATES PATENT OFFICE.

JOHN W. POINTS, OF WASHINGTON, DISTRICT OF COLUMBIA, ASSIGNOR TO THE AUTOMATIC SCALE COMPANY.

PRICE-SCALE.

SPECIFICATION forming part of Letters Patent No. 677,794, dated July 2, 1901.

Application filed December 24, 1900. Serial No. 40,948. (No model.)

*To all whom it may concern:*

Be it known that I, JOHN W. POINTS, a citizen of the United States, residing at Washington, in the District of Columbia, have invented a new and useful Price-Scale, of which the following is a specification.

The invention relates to improvements in price-scales.

One object of the present invention is to improve the construction of price-scales and to provide a simple, inexpensive, and efficient one capable of simultaneously indicating the weight and price of the goods weighed and adapted to be readily adjusted to correct any inaccuracies resulting from long use of the scale or from other causes.

Another object of the invention is to provide a scale of this character which will indicate the weight of the goods at both its front and back, so that the purchaser and seller may readily see the same without changing the position of the scale and also to enable the numbers indicating the prices to be arranged so that they may be conveniently read by the person selling the goods.

The invention consists in the construction and novel combination and arrangement of parts hereinafter fully described, illustrated in the accompanying drawings, and pointed out in the claims hereto appended.

Figure 11:
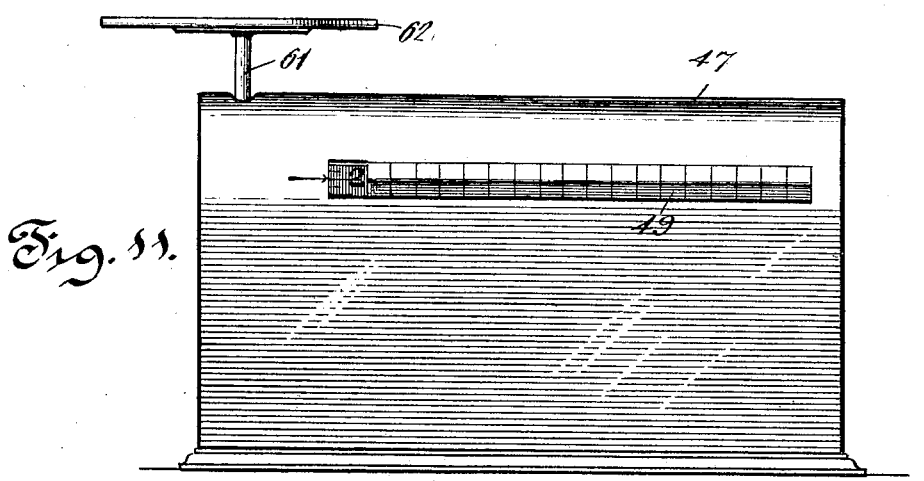
Figure 12:
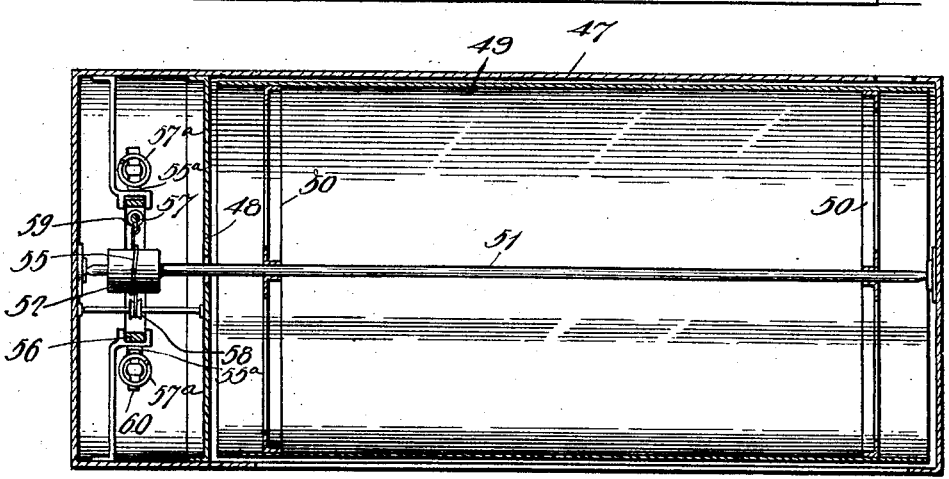
Figure 13:
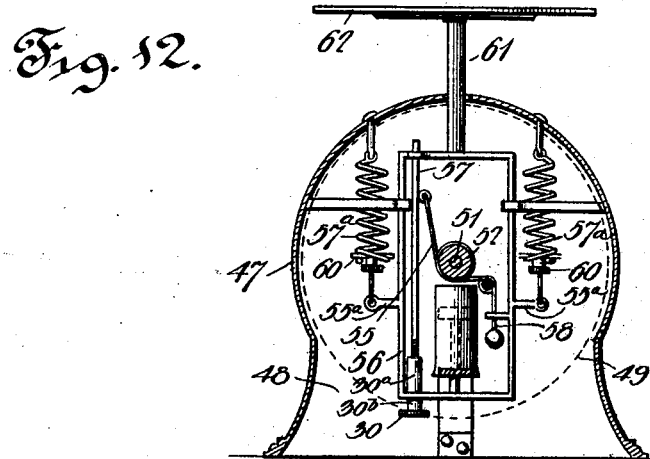

In the drawings, Figure 1 is an elevation of a price-scale constructed in accordance with this invention. Fig. 2 is a vertical sectional view of the same, the scale-pan being removed. Fig. 3 is a rear elevation of the upper portion of the scale, illustrating the arrangement of the aperture for indicating the weight to the buyer. Fig. 4 is a horizontal sectional view on the line 4 4 of Fig. 2. Fig. 5 is a similar view on the line 5 5 of Fig. 2. Fig. 6 is a vertical sectional view showing another form of tension device for maintaining the flexible connection taut. Fig. 7 is a vertical sectional view illustrating a modification of the invention. Fig. 8 is a detail view of a portion of the chart. Fig. 9 is a detail sectional view illustrating the construction of the adjusting-nut. Fig. 10 is a detail view of the adjustable indicator of the rear sight-aperture. Fig. 11 is an elevation illustrating another modification of the invention. Fig. 12 is a horizontal sectional view of the same. Fig. 13 is a transverse sectional view.

Like numerals of reference designate corresponding parts in all the figures of the drawings.

1 designates a cylindrical casing arranged vertically and provided at its top with an eye or ring 2 for suspending it from a hook or other suitable support, and the said eye or ring may be connected with the top of the cylinder in any suitable manner. The lower edge of the vertical cylinder is secured by suitable fastening devices to an outer upwardly-extending annular flange 3 of an annular plate or ring 4, disposed horizontally and forming a base for a supporting-frame 5. The cylindrical casing 1, which may be constructed in any suitable manner, preferably consists of a sheet of metal bent into cylindrical form and connected at the adjacent edges by a plate 6, provided with diagonally-disposed openings 7, arranged at an inclination, as clearly illustrated in Fig. 1 of the accompanying drawings, and adapted to expose inclined or diagonally-arranged series of numerals of a chart 8. The chart 8, which is arranged in the form of a cylinder and which is rotated by the means hereinafter described, is located within the casing and is provided with inclined columns of figures adapted to be successively brought to the upper and lower inclined openings 7 for indicating the price of the goods weighed, and by arranging the columns at an inclination their length is increased and the numbers may be read with greater facility and accuracy than when they are arranged in vertical columns. The plate which connects the edges of the sheet metal of which the cylindrical casing is constructed may be secured to the same in any desired manner and is preferably ornamental. The plate is also provided with a central horizontal opening 9 to expose the numbers and graduations for indicating the weight of the goods weighed, and the casing is provided at a diametrically opposite point with a sight-aperture 10 for enabling the purchaser to see the price of the goods. The chart, which may be constructed of any suitable material, such as paper or fabric, is provided with centrally-arranged horizontally-disposed weight-graduations 11, and it has two sets of numerals located, respectively, at the top and bottom of the graduations and having their zero-marks arranged at the openings 9 and 10 when the parts of the scale are in their initial position, so that the weight of the goods will be shown to both the seller and purchaser without changing the position of the scale. The numbers indicating the price of the goods weighed are arranged in columns above and below the centrally-arranged weight-graduations, and the plate 6 is provided with numbers corresponding with the numbers of the chart and indicating the price per pound.

The support or frame 5, which is of general oblong shape, forms a guide for a vertically-movable frame or support 12 and is composed of vertical sides and a connecting top piece, and the sides are provided at their lower ends with horizontal arms or extensions which are secured to the upper face of the horizontally-disposed annular plate or ring 4, which forms the base of the casing. The sides of the support or frame 5 are provided between their ends with a horizontal cross-piece 13, provided with apertures 14 and forming guides for the vertically-movable frame or support 12. The stationary frame or support of the casing is provided at its top with hooks 15 or other suitable devices for engaging the upper end of coiled spring 16, which has its lower end connected with the vertically-movable frame and which is adapted to resist the downward movement of a scale pan or receptacle 17, also connected with the vertically-movable frame. The scale-pan is adapted to receive the goods to be weighed and is connected with the bottom of the vertically-movable frame by a suitable swivel 18; but instead of employing a scale-pan a hook or any other suitable device may be provided for receiving the goods to be weighed. The top of the vertically-movable frame is provided with a central opening to receive the lower end of the coiled spring, which is engaged at that point by hooks 19 of a rotary adjusting device or nut 20, swiveled to or journaled on the top of the vertically-movable frame and adapted to be rotated to lengthen or shorten the spring to correct any inaccuracies resulting from long use of the scale. The adjusting device or nut 20 may be secured to the top of the vertically-movable frame by plates 21, having L-shaped portions or hooks extending over the top of the adjusting device, as clearly illustrated in Fig. 2 of the accompanying drawings.

The rotary chart is connected by a suitable spider 22 with the upper end of a vertical axially-arranged shaft 23, journaled in suitable bearings of the stationary frame or support 5 and extending through the coiled spring 16, which is disposed vertically. The lower end of the shaft is preferably stepped in a suitable bearing of a horizontal cross-piece 13, and its upper end extends through a bearing-opening of the top of the frame 5. The vertical shaft 23 is provided at its lower portion with an enlargement or drum 24, receiving a flexible connection 25, which is coiled around the enlarged portion or drum of the shaft and which is adapted to be moved longitudinally by the vertical movement of the frame 12 to rotate the shaft and actuate the rotary chart. The flexible connection, which may consist of a metallic ribbon, a cord, or a chain or the like, may have one or more turns around the shaft, and it extends from opposite sides of the same to a pair of guide-pulleys 26 and 27, mounted in suitable brackets, which are secured to the horizontal cross-piece of the stationary support or frame. The upper terminal of the flexible connection is secured to an adjusting device 28, consisting of a vertically-movable rod 29 and a nut 30, engaging a lower threaded portion 31 of the rod, which passes through openings of the horizontal cross-piece 13 and the top of the vertically-movable frame, as clearly shown in Fig. 2. The nut, which is swiveled to the bottom of the vertically-movable frame, is adapted to be rotated to force the rod 29 upwardly and also to draw it downward, and it is preferably composed of a tubular upper portion and a lower head. The tubular upper portion is interiorly threaded to receive the rod 29, and it is provided with a depending stem 30$^a$, extending through a perforation of the bottom of the vertically-movable frame or support 12 and fitting in a socket 30$^b$ of the head of the nut and engaged by a clamping-screw, as clearly illustrated in Fig. 9 of the accompanying drawings. Instead of constructing the swiveled nut in this manner it may be of any other desired construction. The upper end of the rod is provided with an arm to which the flexible connection is attached, and when the rod is moved vertically the flexible connection is moved longitudinally and the vertical shaft is rotated. This adjustment of the flexible connection enables the rotary chart to be properly positioned with relation to the casing, so that the scale will indicate zero when it is not in use and when the spring is not distended. In order to enable the flexible connection to be adjusted longitudinally by the said adjusting device, the lower terminal of the flexible connection is attached to a tension device which may consist of a spring 32, as illustrated in Fig. 2, or it may consist of a weight 33, as shown in Fig. 6; but the said tension device, besides permitting the adjustment of the flexible connection, also operates to maintain the same taut, and it secures the necessary frictional engagement between the flexible connection and the vertical shaft to cause a positive and accurate rotation of the latter and a consequent movement of the rotary chart when the spring-resisted weight-receptacle or scale-pan moves vertically. The spring 32 is located beneath an arm 34 of a vertically-movable frame, and it is connected with the lower end of the flexible connection by means of a stem or rod 35, having a head 36 and extending through the spring 32 and through an opening of the arm 34. The head of the rod or stem 35 may consist of a nut adapted to be rotated to regulate the tension of the spring 32. Any other suitable means may be employed for connecting the spring with the lower end of the flexible connection.

When the weight 33 is employed, as illustrated in Fig. 6 of the accompanying drawings, it is preferably guided within a suitable well or casing 37; but any other means may be employed to prevent the weight from swaying within the scale-casing.

The sight-aperture 10 at the back of the casing is provided with a plate 11$^a$, of glass or other transparent material, arranged within an oblong frame 11$^b$, provided at its top with a slot in which is mounted an adjustable pointer or indicator 11$^c$. The adjustable pointer or indicator, which is engaged by a set-screw 11$^d$, is adapted to be moved in either direction to position it properly with relation to the chart, so that it will indicate zero when the scale-pan is not subjected to any weight.

In order to prevent the spring-resisted weight-receptacle from vibrating when goods to be weighed are deposited in it, a dash-pot 38 is employed, and it preferably consists of a plunger connected with the bottom of the vertically-movable frame and operating in an inverted cylinder, as clearly illustrated in Fig. 2 of the accompanying drawings. The cylinder of the dash-pot may be secured to the supporting-frame 5 in any suitable manner, and the piston of the dash-pot may have a pivotal head or may be constructed in any desired manner, and as this construction does not form any part of the present invention it is thought that further description is unnecessary. The dash-pot may be employed or omitted, as desired.

In Fig. 7 of the drawings is illustrated a modification of the invention in which the flexible connection 39 is arranged on a short horizontal shaft 40, connected by bevel-gearing 41 and 42 with a vertical shaft 43, and the latter is designed to be connected with a rotary chart in the same manner as the vertical shaft 23. The shafts 40 and 43 may be journaled in any suitable bearings of the supporting-frame, and the lower end of the flexible connection is provided with a weight 44, and its upper end is connected with an adjusting device 45. When the vertically-movable frame 46, to which the flexible connection is attached by means of the adjusting device, moves upward or downward, the flexible connection will actuate the shaft 40, and motion will be communicated to the rotary chart.

In Figs. 11 to 13, inclusive, of the accompanying drawings is illustrated another modification of the invention, wherein the casing is disposed horizontally and the chart is mounted on a horizontal shaft. The casing 47, which approximates the form of a cylinder, is disposed horizontally and its sides are curved outward at the bottom to form a broad supporting-base, and it is supported near one end by a transverse partition 48. The chart 49, which is supported by suitable spiders 50, is carried by a horizontal shaft 51 and is located between the transverse partition 48 and the farther end of the casing, and the horizontal shaft is journaled in suitable bearings of the ends of the casing and is provided near one end with an enlargement or drum 52. The front and back of the casing are provided with suitable sight-apertures, which may be arranged in any suitable manner, and the rear one may be provided with a suitable adjustable indicator, similar to that heretofore described.

A flexible connection 55 is wound around the enlargement or drum 52 and is connected with a vertically-adjustable frame 56 by means of an adjusting device 57 and a tension device 58. The vertically-adjustable frame, which is supported by suitable guides, is connected with springs 57$^a$, and when it moves vertically the horizontal shaft is rotated and the chart is actuated, as before described. The adjusting device, which consists of a vertically-movable rod and an adjusting-nut, is provided with an eye 59, to which the flexible connection is attached, and the tension device may consist of a weight, or a spring similar to that heretofore described may be provided. The vertically-adjustable frame is provided at opposite sides with horizontally-disposed arms 55$^a$, which are connected with the said springs 57$^a$ by adjusting devices 60, consisting of rotary bodies having laterally-extending arms engaging coils of the springs 57$^a$. The adjusting devices 60 operate as nuts. The laterally-disposed arms engage the coils of the springs and the rotary bodies are of a size to pass through the longitudinal openings of the said springs. The coiled springs form spiral ways, and when the adjusting devices are turned to the right or left they will be moved inward and outward longitudinally, and the active portions of the springs may be varied in length. The springs are secured at their upper ends to the top of the casing, and the vertically-movable frame is provided with a vertical stem or support 61, extending through the top of the casing and carrying a plate or pan 62 for the reception of the goods to be weighed. The chart will be constructed substantially the same as that heretofore described, with the exception that the weight-graduations and numerals will be located at the ends adjacent to the sight-apertures.

It will be seen that the price-scale is simple and comparatively inexpensive in construction, that it is capable of accurately indicating the price and weight of goods, and that it may be readily adjusted to correct any inaccuracy.

What is claimed is—

1. In a device of the class described, the combination of a casing, a shaft, a rotary chart connected with the shaft, a flexible connection wound around the shaft and adapted to be moved longitudinally to rotate the said shaft, a spring-resisted weight-receptacle connected with and adapted to actuate the flexible connection, an adjusting device connected with one end of the said flexible connection and adapted to move the same in either direction, and a tension device arranged at the other end of the flexible connection and coöperating with the said adjusting device in moving the flexible connection longitudinally in either direction, substantially as described.

2. In a device of the class described, the combination of a casing, a shaft, a flexible connection wound around the shaft and adapted to be moved longitudinally to rotate the same a spring-resisted weight-receiver for moving the flexible connection longitudinally, a tension device arranged at one end of the flexible connection, and an adjusting device located at the other end of the flexible connection and coöperating with the said tension device to move the flexible connection longitudinally in either direction, substantially as described.

3. In a device of the class described, the combination of a casing, a shaft, guides located at opposite sides of the shaft, a movable frame arranged in the said guides, a flexible connection carried by the movable frame and wound around the shaft, a spring-resisted weight-receptacle for actuating the flexible connection, a tension device arranged at one end of the flexible connection, and an adjusting device arranged at the other end of the flexible connection and coöperating with the tension device to move the said flexible connection longitudinally in either direction independently of the movable frame, substantially as described.

4. In a device of the class described, the combination of a casing, a shaft, a flexible connection wound around the shaft, a spring-resisted weight-receiver adapted to actuate the flexible connection, an adjusting device composed of a movable rod secured to one of the terminals of the flexible connection and provided with screw-threads, and a nut engaging the latter, and a tension device connected with the other terminal of the flexible connection and coöperating with the adjusting device to enable the said flexible connection to be moved longitudinally in either direction, substantially as described.

5. In a device of the class described, the combination of a vertically-disposed approximately-cylindrical casing, a stationary frame or support arranged within the casing, a vertically-movable frame guided on the stationary frame or support, a spring connecting the vertically-movable frame with the stationary frame or support, a vertical shaft journaled in suitable bearings within the casing, a rotary chart connected with the vertical shaft, a flexible connection wound around the vertical shaft and connected with the vertically-movable frame, and guides connected with the stationary frame and located at opposite sides of the shaft and receiving the flexible connection, substantially as described.

6. In a device of the class described, the combination of a vertical casing, a vertical frame or support fixed to the casing, a vertically-movable frame guided on the fixed frame, a shaft arranged within the casing, a rotary chart connected with and actuated by the shaft, a spring connected with the vertically-movable frame, a flexible connection wound around the shaft, an adjusting device arranged at one of the terminals of the flexible connection and connecting the same with the vertically-movable frame, and a tension device located at the other end of the flexible connection, and coöperating with the adjusting device to move the flexible connection longitudinally in either direction independently of the movable frame, substantially as described.

7. In a device of the class described, the combination of a casing, a stationary frame arranged within the casing, a vertically-movable frame guided by the stationary frame, a spring connecting the said frames, an adjusting device mounted on the vertically-movable frame and engaging the spring and adapted to lengthen and shorten the same, a shaft extending through the spring and supported by the stationary frame, a chart connected with the shaft, a weight-receiver suspended from the vertically-movable frame, and means for communicating motion from the vertically-movable frame to the shaft, substantially as described.

8. In a device of the class described, the combination of a vertical casing, a stationary frame, a vertically-movable frame guided on the stationary frame, a vertical spring connecting the frames, a vertical shaft extending through the spring and supported by the stationary frame, a rotary chart arranged within the casing and connected with the upper end of the vertical shaft, a flexible connection wound around the vertical shaft, and means for adjustably connecting the flexible connection with the vertically-movable frame, substantially as described.

In testimony that I claim the foregoing as my own I have hereto affixed my signature in the presence of two witnesses.

JOHN W. POINTS.

Witnesses:
E. E. DOYLE,
FRANK S. APPLEMAN.